(12) United States Patent
Kurobe et al.

(10) Patent No.: US 8,451,857 B2
(45) Date of Patent: *May 28, 2013

(54) COMMUNICATION APPARATUS ENABLING TEMPORAL COEXISTENCE OF SYSTEMS

(75) Inventors: Akio Kurobe, Osaka (JP); Koji Ikeda, Osaka (JP); Go Kuroda, Osaka (JP); Hisao Koga, Fukuoka (JP); Yuji Igata, Fukuoka (JP)

(73) Assignee: Panasonic Corporation, Osaka (JP)

( * ) Notice: Subject to any disclaimer, the term of this patent is extended or adjusted under 35 U.S.C. 154(b) by 166 days.

This patent is subject to a terminal disclaimer.

(21) Appl. No.: 13/090,540

(22) Filed: Apr. 20, 2011

(65) Prior Publication Data

US 2011/0222554 A1    Sep. 15, 2011

Related U.S. Application Data

(62) Division of application No. 11/440,014, filed on May 25, 2006, now Pat. No. 7,953,105.

(30) Foreign Application Priority Data

May 26, 2005    (JP) ................................. 2005-154501
Mar. 27, 2006    (JP) ................................. 2006-086191

(51) Int. Cl.
*H04W 74/04* (2009.01)

(52) U.S. Cl.
CPC .................................. *H04W 74/04* (2013.01)
USPC ....................................................... 370/459

(58) Field of Classification Search
USPC .................. 370/445, 447, 458, 459, 461, 462
See application file for complete search history.

(56) References Cited

U.S. PATENT DOCUMENTS

| | | | | |
|---|---|---|---|---|
| 5,359,595 A | * | 10/1994 | Weddle et al. | 370/468 |
| 6,097,707 A | | 8/2000 | Hodzic et al. | |
| 6,141,336 A | * | 10/2000 | Bauchot et al. | 370/348 |
| 6,256,317 B1 | * | 7/2001 | Holloway et al. | 370/447 |
| 6,587,453 B1 | | 7/2003 | Romans et al. | |
| 6,975,613 B1 | * | 12/2005 | Johansson | 370/338 |

(Continued)

FOREIGN PATENT DOCUMENTS

| | | |
|---|---|---|
| JP | 2002-368831 | 12/2002 |
| JP | 2004-48356 | 2/2004 |
| WO | 03/100996 | 12/2003 |

OTHER PUBLICATIONS

International Search Report and Written Opinion of the International Searching Authority issued Aug. 18, 2006 in International Application No. PCT/JP2006/310838.

(Continued)

*Primary Examiner* — Ricky Ngo
*Assistant Examiner* — Phuongchau B Nguyen
(74) *Attorney, Agent, or Firm* — Wenderoth, Lind & Ponack, L.L.P.

(57) ABSTRACT

A coexistence controller which performs management and control of time division for coexistence, is provided in a power line communication modem which has a function as a QoS controller for a QoS type communication system and a power line communication modem for a best-effort type communication system. In the QoS type communication system, by controlling allocation of a communication band in accordance with priorities given to the communication systems by cooperation of the coexistence controller and the QoS controller, the power line communication systems having different schemes can coexist.

2 Claims, 20 Drawing Sheets

U.S. PATENT DOCUMENTS

| | | | |
|---|---|---|---|
| 7,672,232 B2 * | 3/2010 | Ayyagari et al. | 370/230 |
| 7,953,105 B2 * | 5/2011 | Kurobe et al. | 370/459 |
| 2002/0191588 A1 | 12/2002 | Personick | |
| 2002/0196808 A1 | 12/2002 | Karri et al. | |
| 2005/0047379 A1 | 3/2005 | Boyden et al. | |
| 2005/0058151 A1 | 3/2005 | Yeh | |
| 2006/0034330 A1 | 2/2006 | Iwamura | |
| 2008/0123594 A1 | 5/2008 | Yoshizawa et al. | |
| 2008/0175265 A1 | 7/2008 | Yonge et al. | |

OTHER PUBLICATIONS

Yu-Ju Lin et al., "A Comparative Performance Study of Wireless and Power Line Networks", IEEE Communications Magazine, Apr. 2003, pp. 54-63.

Shinichiro Ohmi et al., "A Media Access Control Method for High-Speed Power Line Communication System Modems", IEEE CCNC, Jan. 2004, pp. 1-6.

* cited by examiner

F I G. 4
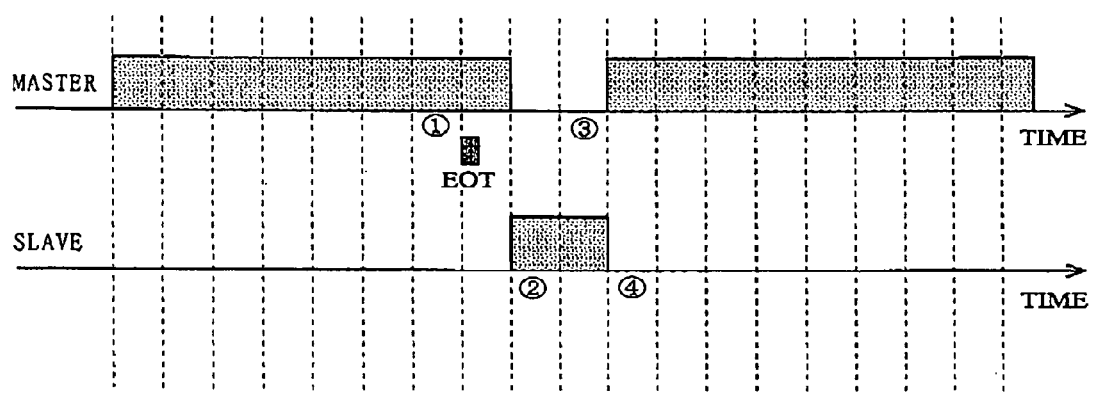

F I G. 9
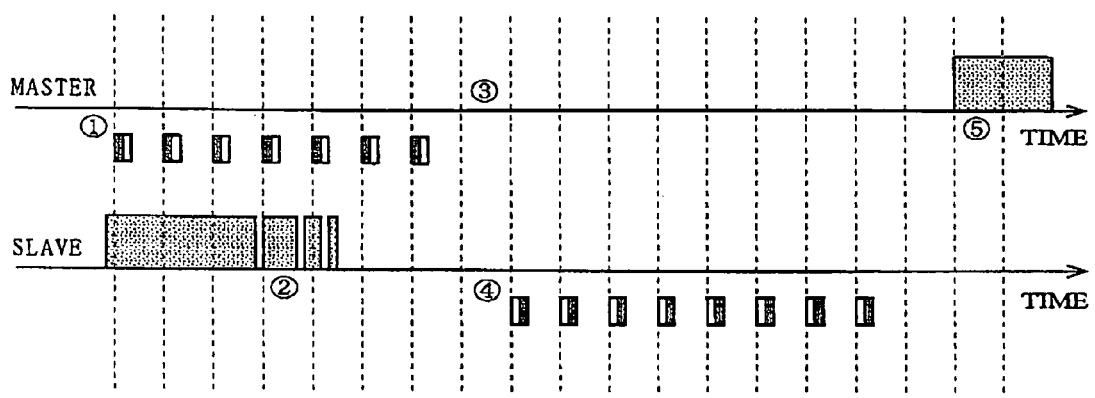

(a) BEST EFFORT (b) QoS (c) COEXISTENCE OF QoS AND BEST EFFORT

COMMUNICATION APPARATUS ENABLING TEMPORAL COEXISTENCE OF SYSTEMS

This application is a divisional of application Ser. No. 11/440,014, filed May 25, 2006 now U.S. Pat. No. 7,953,105.

BACKGROUND OF THE INVENTION

1. Field of the Invention

The present invention relates to a communication apparatus which enables temporal coexistence of systems, and more particularly to, a communication system which enables coexistence of a plurality of different communication schemes (a communication system which guarantees Quality of Service (QoS) and a communication system which performs best-effort communication) on the same communication medium, such as a power line or the like.

2. Description of the Background Art

Power Line Communications (PLC) has attracted attention as a technology for connection of a network apparatus, such as a broadband router or the like, so as to access from a Personal Computer (PC) or the like in a home to the Internet. In the power line communication, since an existing power line is used as a communication medium, it is not necessary to construct a new infrastructure, and high-speed communication can be achieved only by inserting a power supply plug into a power supply outlet in a home. Therefore, research and development, and demonstration experiments have been vigorously conducted all over the world, and in Europe and the USA, and a number of PLC projects have already been commercialized.

An example of the PLC is HomePlug Ver. 1.0, which is a specification created by the HomePlug Powerline Alliance (USA). The specification is intended to be used mainly in applications, such as the Internet, mailing and file transfer which are performed by a PC. HomePlug employs a CSMA/CA technique for a medium access control of which power line communication modem accesses a power line. Therefore, only best-effort communication which does not guarantee a band to be used can be achieved. See, for example, Yu-Ju Lin, Haniph A. Latchman, and Richard E, "A Comparative Performance Study of Wireless and Power Line Networks", IEEE Communications Magazine, April 2003, pp. 54-63.

FIG. 17 is a diagram illustrating a general configuration when a PC is used to access from a home to the Internet.

A PC 1101 which is used by a user is connected via an Ethernet 1102 to an Internet access router 1104, through which the PC 1101 is connected via an access line 1103 to the Internet 1105. As the access line 1103, ADSL (Asymmetric Digital Subscriber Line), FTTH (Fiber To The Home) or the like is generally used. Here, it is often that a place where the access line 1103 is withdrawn into the home is different from a room where the PC 1101 is placed. In this case, a cable of the Ethernet 1102 needs to be extended from the Internet access router 1104 to the PC 1101.

In the field of power line communication, in order to reduce the extension, a conversion adaptor (hereinafter referred to as a P/E conversion adaptor) between power line and Ethernet has been commercialized. FIG. 18 illustrates a general configuration related to access to the Internet when the P/E conversion adaptor is used.

A PC 1101 which is used by a user is connected via an Ethernet 1102 to a P/E conversion adaptor 1205, through which the PC 1101 is connected via an outlet to an in-home power line 1208. Data is transferred to a P/E conversion adaptor 1205 for an Internet access router 1104 by power line communication. The P/E conversion adaptor 1205 is connected via the Ethernet 1102 to the Internet access router 1104. The Internet access router 1104 is connected via an access line 1103 to the Internet 1105.

On the other hand, there is a trend toward construction of a new network appliance system by applying Internet technologies grown in the PC field to AV apparatuses and communication apparatuses. The trend is being developed into a new system, such as association of an AV server (a DVD recorder, an HDD recorder, etc.) with a TV which are placed in different rooms (a network function is added to the AV apparatuses), fusion of an IP telephone or an IP camera with a TV or a PC (the Internet technology is applied).

FIG. 19 is a diagram illustrating a specific example of the above-described new system. Communication of AV streams or speech requires guarantee of real-time communication, unlike the conventional Internet, mailing and file transfer. Particularly, telephone services or the like, which perform real-time two-way speech communication, have a strict requirement for limitation on delay in communication, and generally, the delay is limited to about 10 msec. For such services requiring guarantee of QoS, best-effort communication does not satisfy required quality.

Therefore, a power line communication scheme which guarantees QoS has been developed. See, for example, Shinichiro Ohmi, "A Media Access Control Method for High-Speed Power Line Communication System Modems", IEEE CCNC 2004. FIG. 20 is a diagram illustrating power line communication which performs best-effort communication (hereinafter referred to as best-effort type power line communication) and power line communication which requires guarantee of QoS (hereinafter referred to as QoS type power line communication). In FIG. 20, the vertical axis indicates frequency and the horizontal axis indicates time.

In the case of HomePlug Ver. 1.0, which is one kind of best-effort type power line communication, frequencies used therein are about 2 MHz to 21 MHz. The time axis varies, depending on data generating timing or a data amount. For displaying of a website on the Internet or acquisition of a mail, the services can still hold despite their delayed arrival if the delay is within a tolerable range.

On the other hand, many kinds of QoS type power line communication aim high-speed transmission of video data, and therefore, use a broader frequency band. Also, in order to guarantee QoS, a QoS controller is provided in a system. The QoS controller transmits a beacon in constant intervals to control transmission timing and a transmitted data amount of a power line modem ((b) of FIG. 20). The QoS controller may be provided as a function of the power line modem, and in the example of FIG. 19, is included in a P/E conversion adaptor 1309.

If the amount of video data is assumed to be constant and the communication rate is also assumed to be constant, data having a constant duration is transmitted on a power line in constant intervals ((b) of FIG. 20). If these pieces of data do not arrive by respective predetermined times, video is disturbed, so that the service does not hold. In addition, an apparatus connected to the power line and its operating state vary with time, so that the communication state is actually not constant and varies with time. If the communication rate decreases, a time required to communicate the same amount of data changes. Therefore, when the power line modem which communicates video data detects a reduction in the rate, the power line modem informs the QoS controller of that using a communication command so that a time required to communicate the same amount of data is allocated, thereby making it possible to guarantee QoS. This is illustrated in FIG. 21. In FIG. 21, the power line modem which has detected a decrease in the communication rate transmits an allocated time change command to the QoS controller to change a time required to communicate the following data into a long time. Thereby, it is possible to continue to maintain communicating the same amount of data per unit time.

As described above, various power line communication techniques have been developed. However, since all power lines provided in a home are connected to a distribution switchboard, when power line modems employing different communication schemes are used in the same home, a signal which is transmitted to a power line by a power line modem employing one communication scheme is noise for a power line modem employing another communication scheme. Therefore, when power line modems employing different communication schemes perform communications simultaneously, the communications interfere with each other or all the communications are disabled as illustrated in (c) of FIG. 20, resulting in a significant reduction in communication rate.

To avoid this, for example, Japanese Patent Laid-Open Publication No. 2002-368831 proposes a method for controlling data transmission of each power line modem when a plurality of power line modems having different data communication schemes are present on the same power line. FIG. 22 is a diagram for explaining this conventional technique.

In FIG. 22, for example, it is assumed that a selector 61 provided in a management processor 6 selects power line modems 4a to 4m employing a scheme B as transmission-permitted power line modems. In this case, a message generator 62 generates a transmission-permitting message which indicates permission of transmission to the power line modems 4a to 4m employing the scheme B, and a transmission-forbidding message which indicates forbiddance of transmission to power line modems 3a to 3m employing a scheme A. Thereafter, a power line modem 3n employing the scheme A transmits the transmission-forbidding message to the power line modems 3a to 3m employing the scheme A, and a power line modem 4n employing the scheme B transmits the transmission-permitting message to the power line modems 4a to 4m employing the scheme B.

However, the above-described conventional apparatus for managing data communication apparatuses does not have means for correctly determining how much communication time is provided to a QoS type power line communication system and with what timing the communication time is provided to the system so as to enable guarantee of QoS. Also, the data communication apparatus managing apparatus does not have means with which a QoS controller of a QoS type power line communication system determines how much time is provided to another power line communication system. Therefore, the QoS controller does not determine how much time can be provided to a power line modem of a system to which the QoS controller belongs, and therefore, cannot determine whether or not a request for a service can be accepted. Therefore, it is not possible to achieve coexistence of a QoS type power line communication system and a best-effort type power line communication system.

SUMMARY OF THE INVENTION

Therefore, an object of the present invention is to provide a communication system which enables coexistence of a QoS type power line communication system and a best-effort type power line communication system.

The present invention is directed to, in a system in which a plurality of communication systems coexist on the same communication medium due to time division communication, a communication apparatus belonging to a communication system A having a high priority and a communication apparatus belonging to a communication system B not having a highest priority. The communication medium used by the communication systems A and B may be a power line or a wireless medium.

To achieve the object, the communication apparatus belonging to the communication system A of the present invention comprises a QoS controller for guaranteeing QoS of the communication system A, a master communication manager for collectively managing transmission times of data communication performed by all communication modems in a plurality of communication systems in cooperation with the QoS controller, a command generator for generating a communication permitting command which permits data communication, in accordance with an instruction of the master communication manager, and a transmitter for transmitting the communication permitting command generated by the command generator to a communication apparatus belonging to another communication system.

Preferably, the command generator generates an active-state command which informs the communication apparatus belonging to the other communication system of an active state of the communication system A, in constant time intervals. The transmitter transmits the active-state command to the communication apparatus belonging to the other communication system.

The communication apparatus belonging to the communication system A further comprises a receiver for receiving an active-state command which informs an active state of the other communication system, the active-state command being generated by the communication apparatus belonging to the other communication system. When the active-state command of the other communication system is received, the master communication manager manages the other communication system as a target to which the communication permitting command is to be transmitted, and when the active-state command of the other communication system is not received for a constant time or more, the master communication manager removes the other communication system from the target to which the communication permitting command is to be transmitted.

Also, to achieve the object, the communication apparatus belonging to the communication system B of the present invention comprises a receiver for receiving a communication permitting command which is transmitted from the communication apparatus belonging to the communication system A having the highest priority and permits data communication, and a slave communication manager for managing execution of data communication in a constant time defined by the communication permitting command.

Preferably, the receiver receives an active-state command which informs an active state of the communication system A, from the communication apparatus belonging to the communication system A. When the active-state command of the communication system A is received, the slave communication manager goes to a slave operating state, and when the active-state command of the communication system A is not received for a constant time or more, the slave communication manager cancels the slave operating state.

Preferably, the communication apparatus belonging to the communication system B further comprises a command generator for generating an active-state command which informs the communication apparatus belonging to the communication system A of an active state of the communication system B, in constant time intervals, and a transmitter for transmitting the active-state command to the communication apparatus belonging to the communication system A.

Note that the communication apparatus belonging to the communication system A may comprise a QoS controller for guaranteeing QoS of the communication system A, a master communication manager for collectively managing transmission times of data communication performed by all communication modems in a plurality of communication systems in cooperation with the QoS controller, a command generator for generating a communication slot request command which requests use of a communication slot, in accordance with an instruction of the master communication manager, and a transmitter for transmitting the communication slot request command generated by the command generator as a request having a high priority to a communication apparatus belonging to another communication system.

In the case of this configuration, desirably, the communication apparatus belonging to the communication system A further comprises a state information generator for generating information about the communication slot used for data communication, the information being to be transmitted via the transmitter to the communication apparatus belonging to the other communication system, a receiver for receiving the information about the communication slot used for data communication from the communication apparatus belonging to the other communication system, and a state information interpreter for interpreting the information about the communication slot used for data communication, the information being received by the receiver.

Preferably, the master communication manager may confirm free communication slots freed by the other communication system based on the information interpreted by the state information interpreter, and may determine use of a communication slot required for the communication system A among the free communication slots. Note that, preferably, when the receiver receives the communication slot request command having a high priority, the master communication manager frees half of communication slots which have been so far used.

Similarly, the communication apparatus belonging to the communication system B comprises a receiver for receiving a communication slot request command which is transmitted from the communication apparatus belonging to the communication system A having the highest priority and requests use of a communication slot, and a slave communication manager for performing a control to free a communication slot which has been so far used, in accordance with the communication slot request command.

In the case of this configuration, desirably, the communication apparatus belonging to the communication system B, further comprises a state information generator for generating information about the communication slot used for data communication, the information being to be transmitted via a transmitter to the communication apparatus belonging to the communication system A, a receiver for receiving the information about the communication slot used for data communication from the communication apparatus belonging to the communication system A, and a state information interpreter for interpreting the information about the communication slot used for data communication, the information being received by the receiver.

Preferably, the master communication manager frees a communication slot which has been so far used, in accordance with the communication slot request command transmitted from the communication apparatus belonging to the communication system A, confirms a free communication slot based on information about a communication slot used for data communication, the information being to be transmitted from a communication apparatus belonging to another communication system after a predetermined constant time has elapsed, and use the free communication slot for communication.

According to the present invention, a QoS type communication system and a best-effort type communication system can coexist in accordance with priorities given to the respective communication systems. Thereby, when a plurality of power line communication modems having different communication schemes are introduced into a user's home, it is possible to select which communication scheme type of power line communication modem is caused to manage communication. In addition, it is possible to prevent overlapping of master functions, and select which power line communication modem has a service which should be given priority, for each user. Also, even when either the master or the slave becomes inactive, it is possible to achieve coexistence in which a power line can be used with high efficiency, avoiding waste.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a timing chart based on operations of the coexistence controllers 104 and 204;

FIG. 9 is a timing chart based on other operations of the coexistence controllers 104 and 204;

DESCRIPTION OF THE PREFERRED EMBODIMENTS

An object of the present invention is to enable coexistence of a QoS type communication system and a best-effort type communication system. The QoS type communication system includes at least one QoS controller, and causes a communication modem which provides a service to report a communication band and a delay time required for the service. At the same time, the QoS type communication system causes the communication modem which provides the service to report a communication rate varying with time. Based on the reported communication band and delay time required for the service, it is determined whether or not a newly requested service can be provided simultaneously with the already-provided service, to accept or reject the request (admission control).

It is necessary to guarantee the QoS of a service whose request is accepted, during a period of time for which the service is required. Therefore, the QoS controller allocates a constant time within a cycle time of a system for a communication modem which provides a service for each accepted service, and indicates transmission timing to the communication modem. The QoS controller also has a function of a communication modem, so that the reporting, acceptance/rejection of a request, and instruction of transmission timing are achieved by communicating a communication control command defined between communication modems. When a QoS type communication system needs to coexist with another communication system, the acceptance of a request for a service is determined after a time used by the other coexisting communication system is subtracted. When a service provided by the other communication system is a best-effort service, a time required to guarantee QoS is secured, and thereafter, a remaining time is given to the other communication system.

Hereinafter, embodiments of the present invention will be described, where the present invention is applied to a power line communication system in which a power line is used as a communication medium. Note that the communication medium may be a wireless medium, or a wired medium in addition to a power line.

First Embodiment

Figure 1:
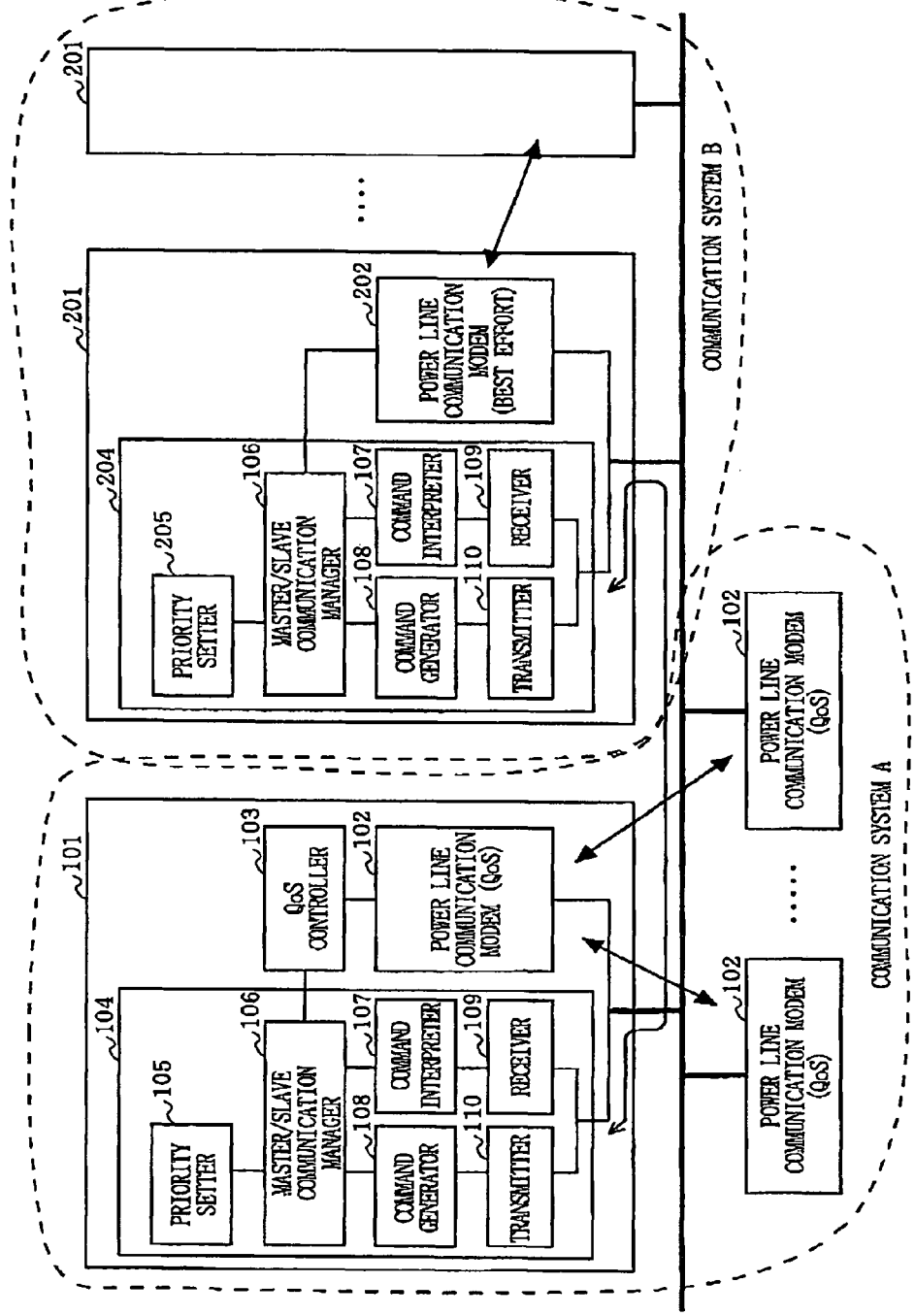
FIG. 1 is a diagram illustrating a configuration of a power line communication system according to a first embodiment of the present invention.

FIG. 1 is a diagram illustrating a configuration of a power line communication system according to a first embodiment of the present invention. In the power line communication system of the first embodiment, a QoS type communication system A and a best-effort type communication system B are connected to each other via a power line. In this example, the communication system A is a master and the communication system B is a slave.

The communication system A comprises a power line communication control modem 101 including a power line communication modem 102, a QoS controller 103 and a coexistence controller 104, and a plurality of power line communication modems 102. The coexistence controller 104 performs various communications so as to achieve a control of coexistence with other power line communication systems. The coexistence controller 104 comprises a priority setter 105, a master/slave communication manager 106, a command interpreter 107, a command generator 108, a receiver 109, and a transmitter 110. In this example, in the priority setter 105, the priority rank of the communication system A is previously set to be in the first place.

The communication system B comprises a power line communication control modem 201 including a power line communication modem 202 and a coexistence controller 204, and a plurality of power line communication modems 202. The coexistence controller 204 performs various communications so as to achieve a control of coexistence with other power line communication systems. The coexistence controller 204 comprises a priority setter 205, a master/slave communication manager 106, a command interpreter 107, a command generator 108, a receiver 109, and a transmitter 110. In this example, in the priority setter 205, the priority rank of the communication system B is previously set to be in the second place.

Figure 2:
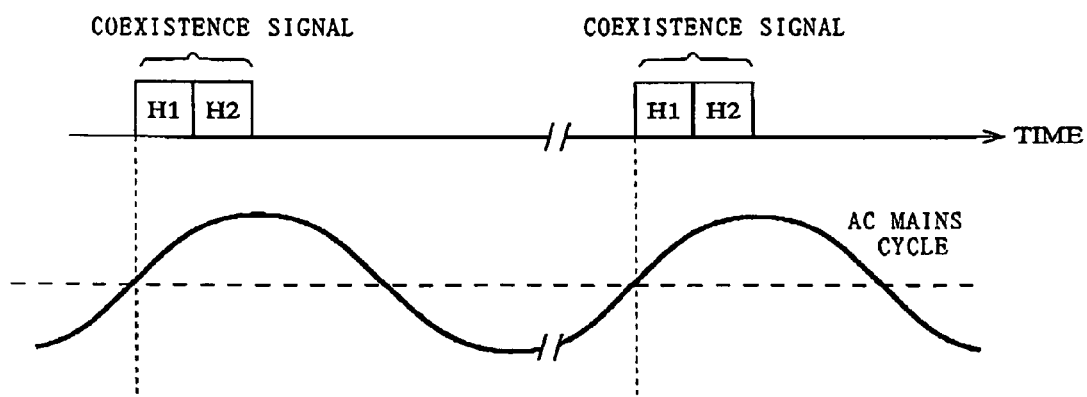
FIG. 2 is a diagram illustrating an exemplary definition of a signal and a command which are received by coexistence controllers 104 and 204.

FIG. 2 is a diagram illustrating an exemplary definition of a signal and a command which are received by the coexistence controllers 104 and 204. For the coexistence controllers 104 and 204, an inexpensive practice price and high communication precision on a power line having harsh communication conditions are required. Therefore, in the present invention, the case where coexistence signals transmitted and received between communication systems are synchronized with each other with high precision using a zero-crossing point of AC mains as a time slot reference, will be described as an example.

In the present invention, a coexistence signal is used in which a first constant time is a slot H1 and the next constant time is a slot H2, where a zero-crossing point of AC mains is used as a reference. Combinations of bits set in the slots H1 and H2 define the following four control commands. Note that these control commands are only for illustrative purposes, and can be arbitrarily set in other ways.

[H1, H2]=[0, 0]: no change
[0, 1]: slave activated state (SOT: start of transmission)
[1, 0]: master activated state (SOT)
[1, 1]: transmission is permitted (EOT: end of transmission)

Figure 3A:
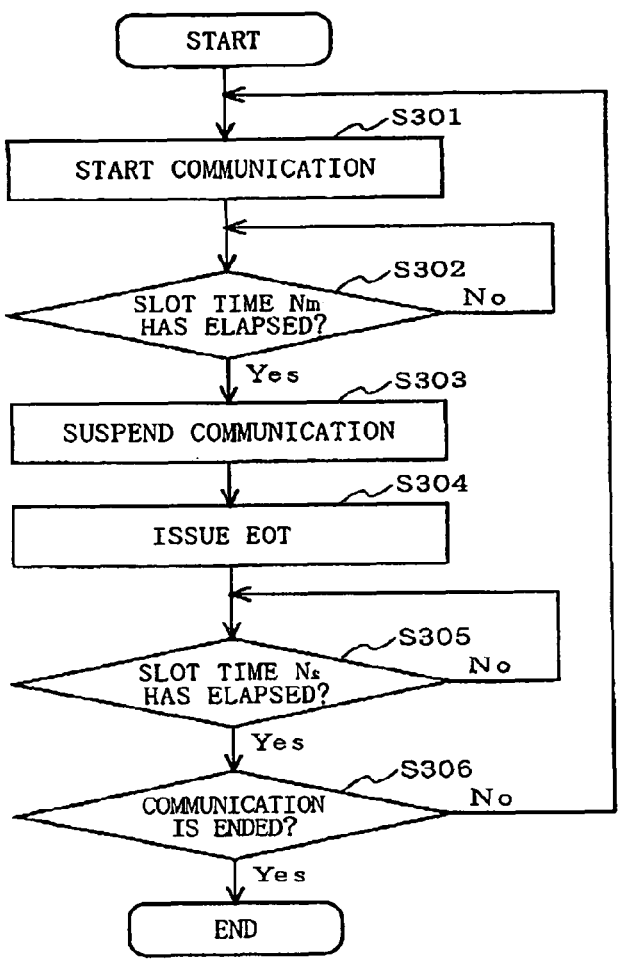
FIG. 3A is a flowchart illustrating an operation of the master coexistence controller 104.
Figure 3B:
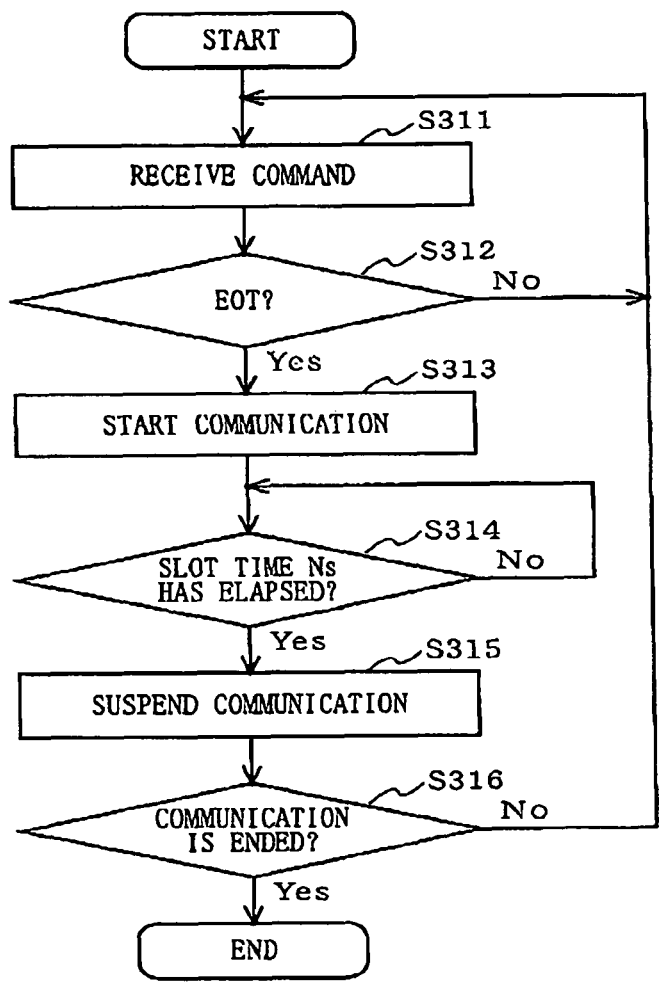
FIG. 3B is a flowchart illustrating an operation of the slave coexistence controller 204.
Figure 5:
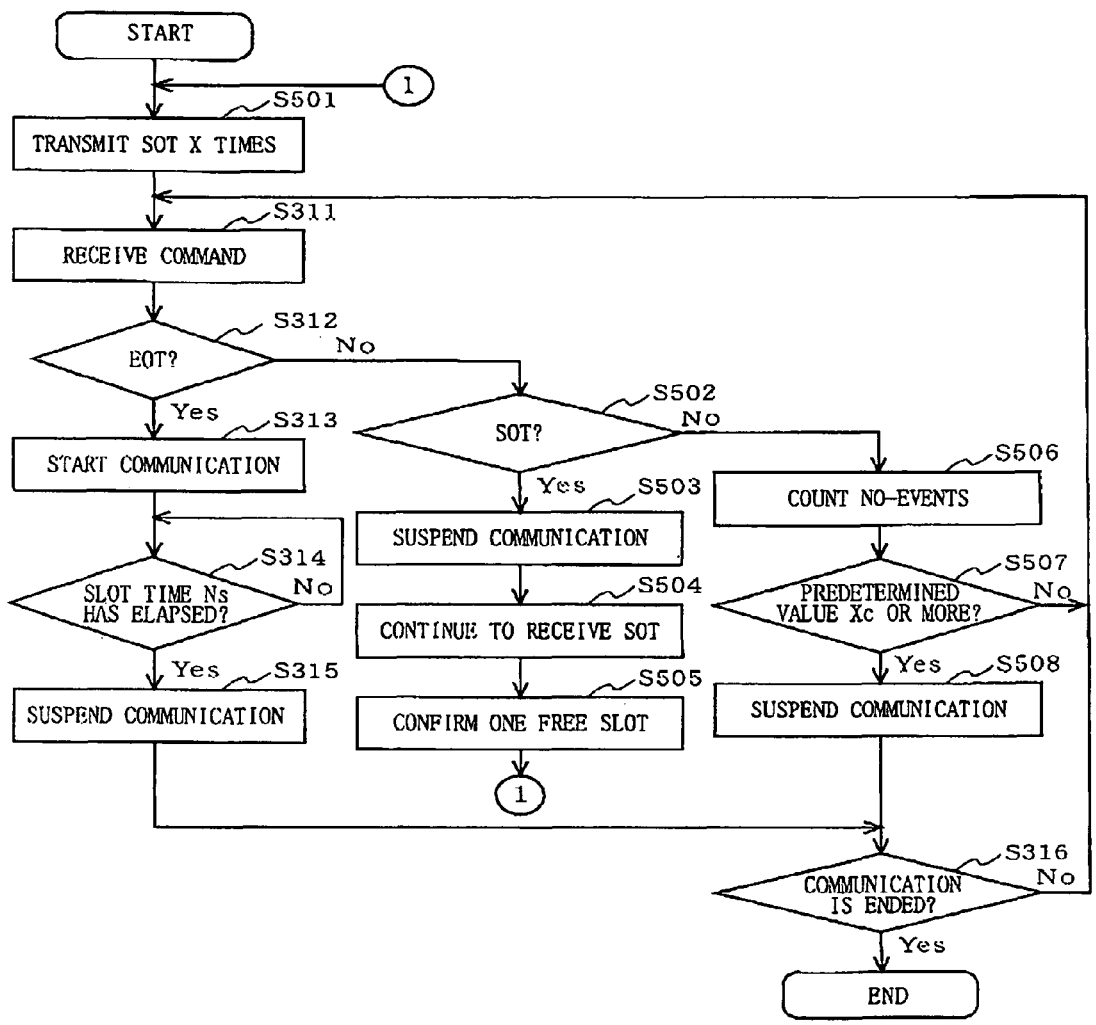
FIG. 5 is a flowchart illustrating another operation of the slave coexistence controller 204.

Hereinafter, coexistence controls performed by the coexistence controllers 104 and 204 will be classified and successively described with reference to FIGS. 3A to 9. FIGS. 3A, 8A and 8B are flowcharts illustrating an operation of the master coexistence controller 104. FIGS. 3B and 5 are flowcharts illustrating an operation of the slave coexistence controller 204. FIGS. 4, 6, 7 and 9 are timing charts based on the operations of the coexistence controllers 104 and 204.

(1) When Both a Master and a Slave are Activated

Initially, the master coexistence controller 104 having the first priority instructs the QoS controller 103 to start communication (step S301). The QoS controller 103 stores a time schedule of communication into a beacon, taking into consideration a predetermined slot time Nm which is employed by the master for communication and a predetermined slot time Ns which is employed by the slave for communication, and informs the power line communication modems 102 belonging to the communication system A of the communication time schedule. Note that, if the sum of the slot time Nm and the slot time Ns is equal to a beacon cycle, the slot time Nm and the slot time Ns may be invariably assigned to fixed positions in the beacon cycle. Each power line communication modem 102 performs communication in accordance with the time schedule stored in the beacon.

After the slot time Nm has elapsed (step S302), the coexistence controller 104 suspends communication and issues EOT (steps S303 and S304, ① in FIG. 4). This EOT is generated by the command generator 108, and is transmitted from the transmitter 110 with timing of a zero-crossing point and with a frequency different from a frequency for data communication. Note that it is preferable that EOT be issued one slot before the end of transmission. After the slot time Ns has elapsed since transmission of EOT (step S305), the coexistence controller 104 determines whether to end or continue communication (step S306).

On the other hand, the slave coexistence controller 204 having the second priority goes to a state in which the slave coexistence controller 204 can receive a command from the master (step S311). When the slave coexistence controller 204 receives EOT from the master (step S312), the coexistence controller 204 instructs the QoS controller 203 to start communication (step S313, ② in FIG. 4). After the slot time Ns has elapsed (step S314), the coexistence controller 204 suspends communication and determines whether to end or continue the subsequent communication (steps S315 and S316, ④ in FIG. 4).

(2) When the Slave is Activated while the Master is not Activated

Figure 6:
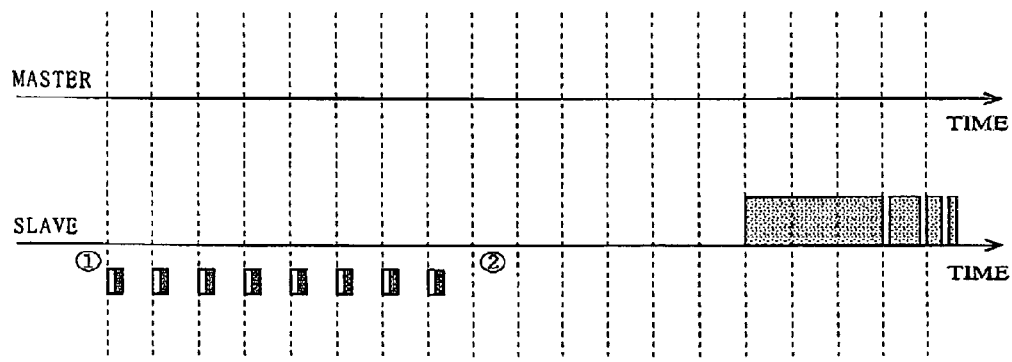
FIGS. 6 and 7 are timing charts based on other operations of the coexistence controllers 104 and 204.

Upon activation, the slave coexistence controller 204 also transmits SOT consecutively X times so as to prevent other communication systems from failing to receive the SOT (step S501, ① in FIG. 6). For example, X is generally assumed to be about eight. The coexistence controller 204 determines whether or not any command has been received from the master (steps S311, S312 and S502). In this case, since no transmission is performed by the master, the coexistence controller 204 determines that there is no event. The number of consecutive times of determining that there is no event is counted (step S506). When the count value exceeds a predetermined number Xc, it is determined that the master is inactive (step S507), so that free communication of the slave is started (step S508, ② in FIG. 6).

(3) When the Slave is Activated while the Master has Already been Activated

Figure 7:
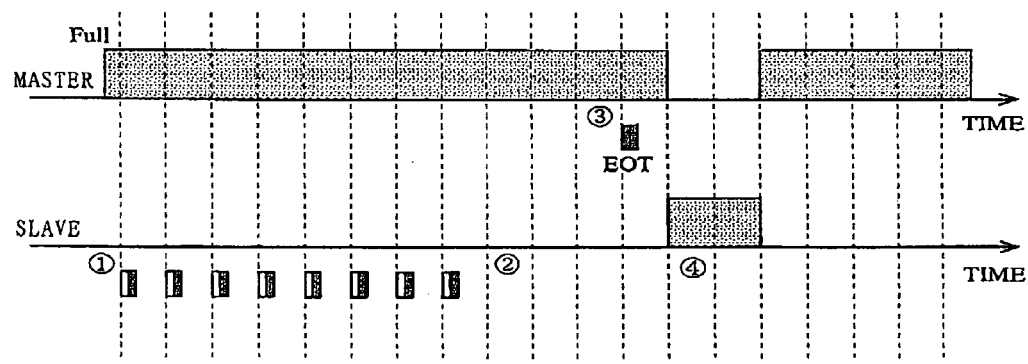
Figure 8A:
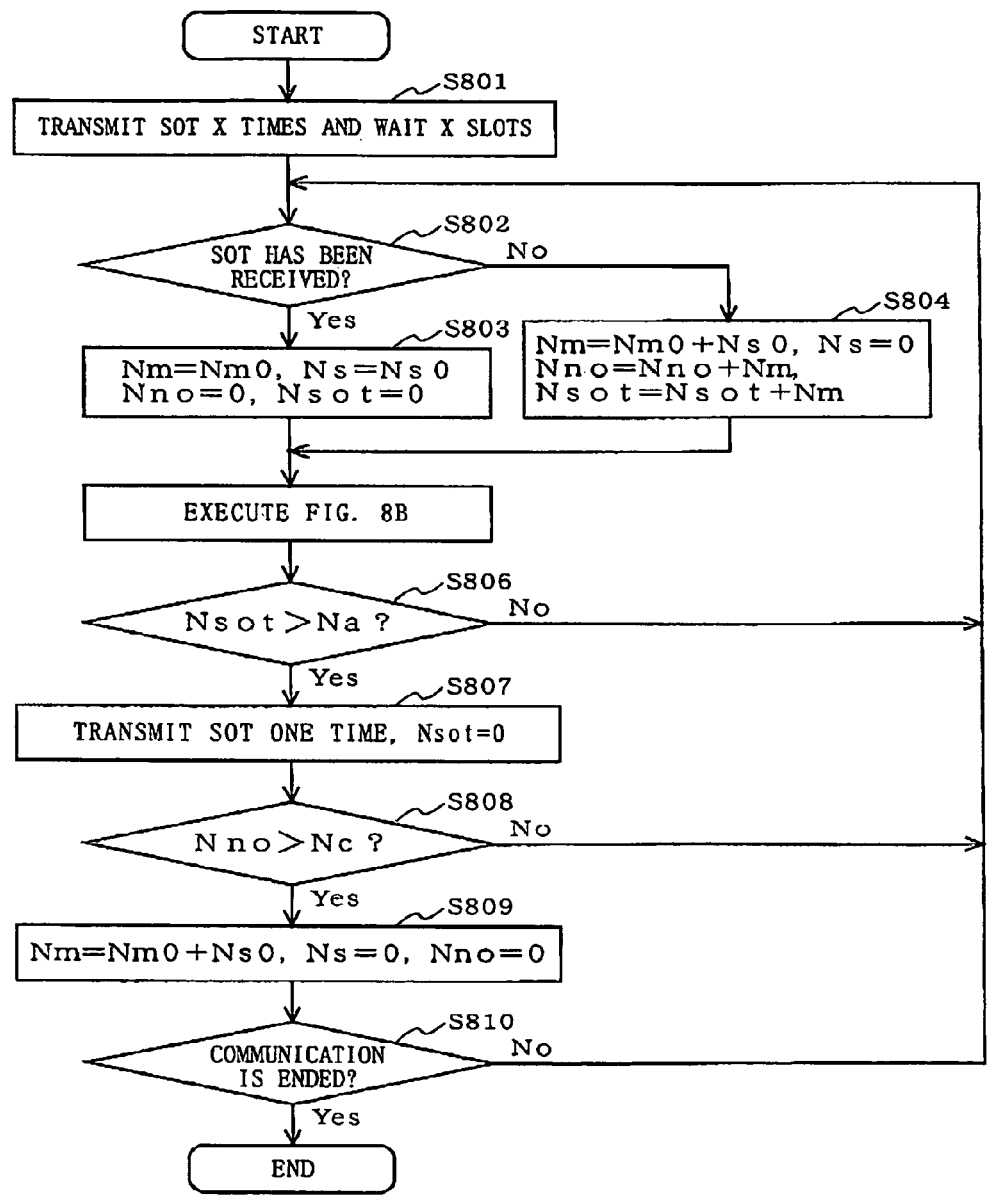
FIGS. 8A and 8B are flowcharts illustrating another operation of the master coexistence controller 104.
Figure 8B:
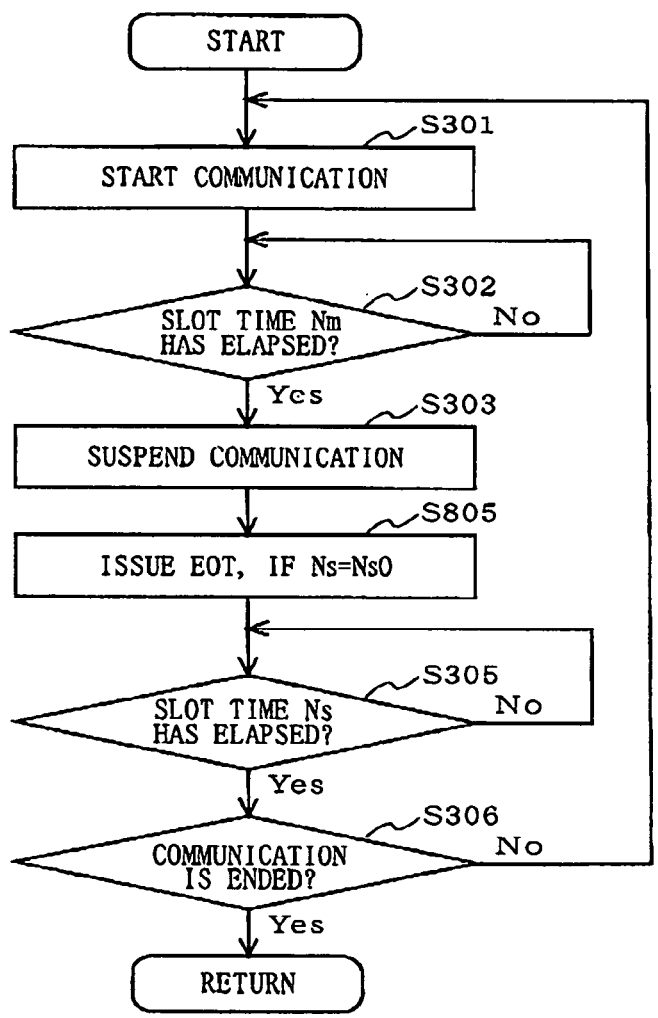

Upon activation, the slave coexistence controller 204 transmits SOT consecutively X times (step S501, ① in FIG. 7). The coexistence controller 204 determines whether or not any command has been received from the master (steps S311, S312 and S502). In this case, since SOT which is being communicated is received from the master, the coexistence controller 204 determines that the master is active, and suspends communication (steps S502 and S503). In this case, the count value of the number of consecutive times of determining that there is no event is reset. Thereafter, the slave coexistence controller 204 confirms reception of an EOT command from the master (③ in FIG. 7), and starts communication (steps S311 and S312, ④ in FIG. 7).

(4) When the Master is Activated while the Slave has Already been Activated

Upon activation, the master coexistence controller 104 transmits SOT consecutively X times (step S801, ① in FIG. 9). The slave coexistence controller 204 itself returns SOT in response to SOT received from the master. In this case, the coexistence controller 204 determines that the master is active, and suspends communication which has been so far executed (steps S502 and S503, ② in FIG. 9). The coexistence controller 204 continues to return SOT until the end of reception of SOT (step S504, ③ in FIG. 9), and one slot after the end of the SOT reception, transmits SOT consecutively X times (④ in FIG. 9).

The coexistence controller 104 determines whether or not SOT has been received from the slave (step S802). In this case, since the coexistence controller 104 receives SOT from the slave, the slot time Nm and the slot time Ns are set to initial values Nm0 and Ns0, respectively (step S803), and a communication process similar to that of (1) is performed.

(5) When the Master is Activated while the Slave is not Activated

Upon activation, the master coexistence controller 104 transmits SOT consecutively X times (step S801). Thereafter, the coexistence controller 104 determines whether or not SOT has been received from the slave (step S802). In this case, since the coexistence controller 104 does not receive SOT from the slave, the slot time Ns is set to be zero and the slot time Nm is set to be Nm0+Ns0 (step S804), and a communication process similar to that of (1) is performed. In this case, a counter Nno for counting the number of consecutive slots in which SOT is not received and a counter Nsot which is used by the master to regularly transmit SOT, are each incremented by the slot time Nm. With this process, all communication times are used by the master, thereby making it possible to prevent from allocating slots to the slave when the slave is inactive.

Thereafter, the coexistence controller 104 determines whether or not the counter Nsot which is used by the master to regularly transmit SOT has reached a predetermined slot number Na (step S806), and when the predetermined slot number Na is reached, transmits SOT and resets the counter Nsot (step S807). In addition, the coexistence controller 104 determines whether or not the counter Nno for counting the number of consecutive slots in which SOT is not received has reached a predetermined slot number Nc (step S808), and when SOT has not been received before the predetermined slot number Nc is exceeded, it is determined that the slave is inactive, Nm, Ns and Nno are set to be Nm0+Ns0, 0 and 0, respectively (step S809). With this process, all communication times can be used by the master without transmitting EOT until the subsequent SOT is received from the slave.

As described above, according to the power line communication system of the first embodiment of the present invention, when the coexistence controller and the QoS controller cooperate, the QoS type communication system and the best-effort type communication system can coexist in accordance with priorities given to the respective communication systems. Thereby, when a plurality of power line communication modems are introduced into a user's home, it is possible to select which power line communication modem is caused to manage communication. In addition, it is possible to prevent overlapping of master functions, and select which power line communication modem has a service which should be given priority, for each user. Also, even when either the master or the slave becomes inactive, it is possible to achieve coexistence in which a power line can be used with high efficiency, avoiding waste.

When the QoS type communication system is given the first priority, a time or timing required to guarantee QoS can be allocated for the QoS type communication system, and a remaining time is allocated for the best-effort type communication system. Also, a transmission right of the best-effort type communication system can be controlled by a QoS type communication modem. Also, the transmission right is returned to the QoS type communication modem is invariably returned a predetermined constant time after the best-effort type communication system starts transmission. Therefore, a variation with time in communication state of a power line can be smoothed out by the QoS type communication system itself adjusting a time interval allocated for a best-effort power line modem, thereby making it possible to certainly guarantee QoS of a modem for which QoS is required. Also, even when a time allocated for a power line modem and a maximum value of the time interval are previously determined, an admission control can be easily determined after subtracting a band to be allocated which is calculated from those, thereby making it possible to achieve a suitable admission control in a coexistence state.

In the above description, the case where there are two priorities of a master and a slave has been described. If the types of commands are increased, the present invention can be similarly practiced in a power line communication system having three or more masters and slaves.

Also, an equally-distributed mode in which priority is not set may be provided. In this case, a communication system which can be set to be a master is provided, and the set master may temporally equally select a communication system which is permitted to communicate, for example.

A method for communicating a command is not limited to the above-described method and may be, for example, a method of using a broadband signal similar to that of a communication modem. In this case, synchronization may be established by transmitting and receiving a preamble or a synchronization flag without depending on the AC mains cycle, thereby making it possible to obtain a similar effect.

Also in a compatible system in which a coexistence controller is used between a communication system having a coexistence controller and one or more other communication systems, the mechanism of a coexistence control between a master and a slave according to the present invention can be applied. A more specific description will be hereinafter given with reference to FIGS. 10 to 12.

Figure 10:
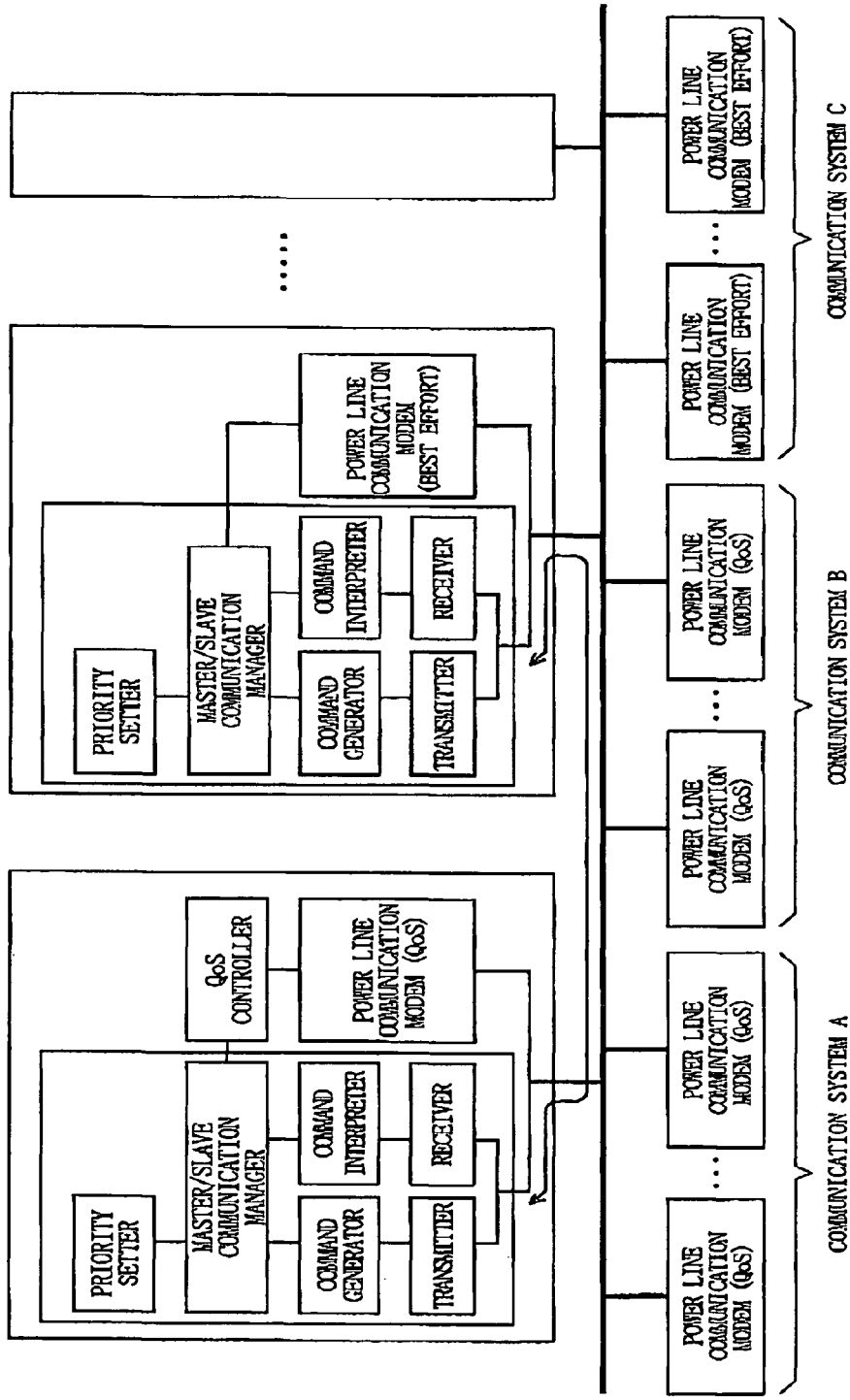
FIG. 10 is a diagram illustrating a configuration of another power line communication system according to a first embodiment of the present invention.

In FIG. 10, communication systems A to C have upward compatibility with each other. Here, for example, it is considered that, when the communication systems B and C can receive and decipher a beacon transmitted by the communication system A, the communication system A indicates transmission timing of the communication systems B and C using the beacon. In this configuration, all the communication systems A to C may be of the QoS type or any of them may be of the best-effort type. Here, the QoS type communication system needs means for informing the communication system A of a band or a time required to guarantee QoS, in addition to beacon reception. In the case of communication systems compatible with each other, the informing means is considered to be easily obtained. It is considered that, when a group of these communication systems compatible with each other are a group of masters, one or a plurality of communication systems which are not compatible with the master group are a group of slaves. In this case, the present invention can be similarly applied.

Figure 11:
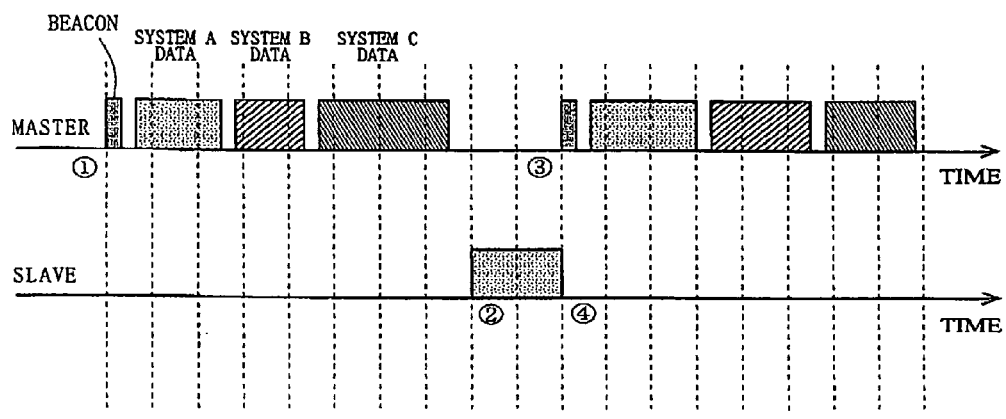
FIGS. 11 and 12 are timing charts based on an operation of the other power line communication system of FIG. 10.

An example of signal transmission and reception in the above-described case is illustrated in FIG. 11. All the communication systems A to C can receive and decipher a beacon transmitted by the QoS controller of the communication system A, and perform transmission for the respective allocated time in accordance with the schedule. In the QoS type communication system B, the QoS controller thereof may transmit a beacon which describes a transmission time of a modem group belonging to the communication system B, at the beginning of the allocated time. Also, in the best-effort type communication system C, a modem group belonging to the communication system C may perform transmission while confirming a free channel, in allocated slots, in accordance with a CSMA access control method. By using the present invention after these compatible communication systems A to C spend a required time, a communication system which is not compatible with the communication systems A to C performs transmission as a slave.

Figure 12:
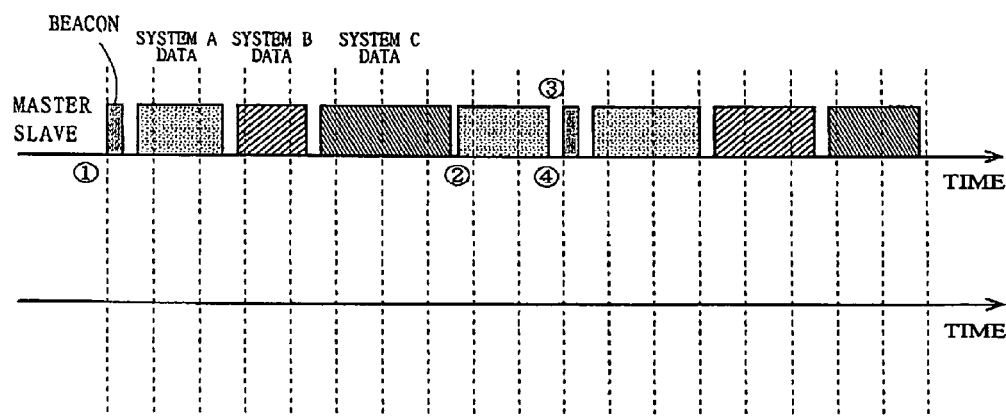

Further, when the slave group has a function of receiving and deciphering beacons transmitted by the master group, the master group can inform of a use time of the slave group in the schedule of the beacon according to the present invention as illustrated in FIG. 12, thereby obtaining a similar effect. In this case, the communication system B and a communication system D is different from each other in the following point. The communication system B has means for conveying a QoS parameter, such as a band, a transmission time or the like, which is required to guarantee QoS, to the communication system A. The communication system D which is originally not compatible with the communication system A has a function of receiving and deciphering a beacon, but does not have means for conveying the QoS parameter to the communication system A.

Second Embodiment

Figure 13:
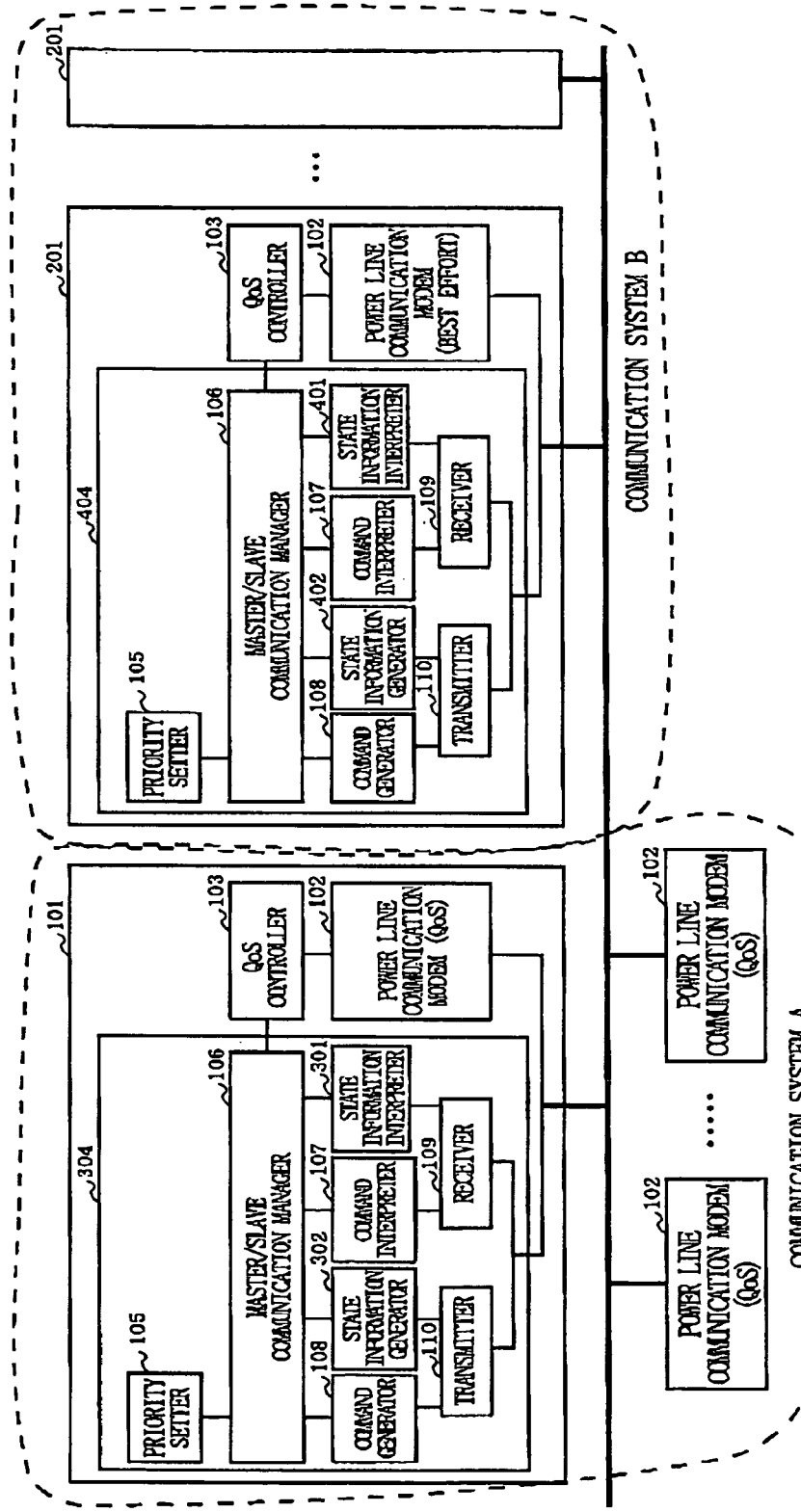
FIG. 13 is a diagram illustrating a configuration of a power line communication system according to a second embodiment of the present invention.

FIG. 13 is a diagram illustrating a configuration of a power line communication system according to a second embodiment of the present invention. In the power line communication system of the second embodiment of FIG. 13, a QoS type communication system A and a best-effort type communication system B are connected to each other via a power line. The communication system A comprises a power line communication control modem 101 including a power line communication modem 102, a QoS controller 103 and a coexistence controller 304, and a plurality of power line communication modems 102. The communication system B comprises a power line communication control modem 201 including a power line communication modem 202 and a coexistence controller 404, and a plurality of power line communication modems 202.

As can be seen from comparison of FIG. 1 and FIG. 13, the communication system A of the second embodiment further comprises a state information interpreter 301 and a state information generator 302, and the communication system B further comprises a state information interpreter 401 and a state information generator 402, as compared to those of the first embodiment. Other parts are similar to those described in the first embodiment, and therefore, are referenced with the same reference numerals and will not be described.

Figure 14:
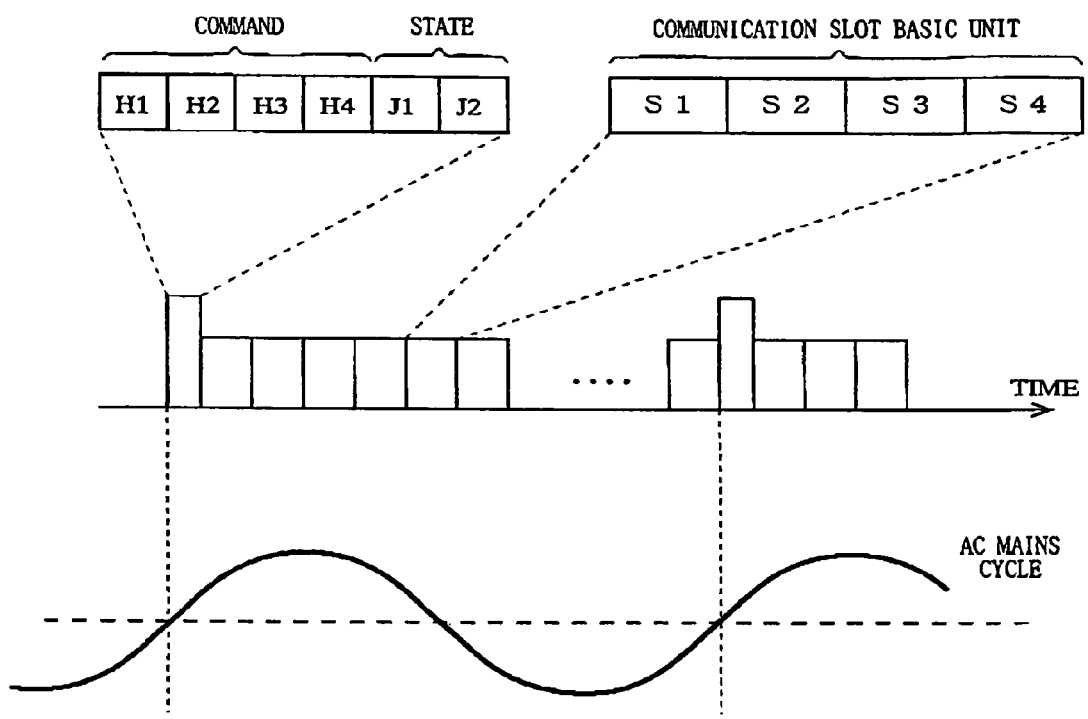
FIG. 14 is a diagram illustrating an exemplary definition of a signal and a command transmitted and received by coexistence controllers 304 and 404.

FIG. 14 is a diagram illustrating an exemplary definition of signals, commands and states transmitted and received by the coexistence controllers 304 and 404. The coexistence controllers 304 and 404 also use a zero-crossing point of AC mains as a time slot reference for a reason similar to that described regarding the coexistence controllers 104 and 204. In the present invention, a coexistence signal is used in which, using a zero-crossing point of AC mains as a reference, a first constant period of time is a slot H1, the following constant periods of time are slots H2 to H4, and the further following constant periods of time are slots J1 and J2.

The slots H1 to H4 correspond to communication slots S1 to S4 obtained by subdividing communication slot basic units which are basic units of coexistence due to TDM (Time Division Multiplex), and are each defined to represent a used state of the time slot using one bit. For example, bit "1" indicates that the time slot is used, and bit "0" indicates that the time slot is unused. In power line communication systems which coexist due to TDM, the whole or a part of the communication slots S1 to S4 are used to perform communication. In a normal state, the communication systems successively perform communication by using predetermined slots without collision with each other. Combinations of bits set in the slots J1 and J2 define the following three control commands. Note that these control commands are only for illustrative purposes, and can be arbitrarily set in other ways.

[J1, J2]=[0, 0]: no request

[1, 0]: low-priority communication slot request command

[1, 1]: high-priority communication slot request command

Figure 15:
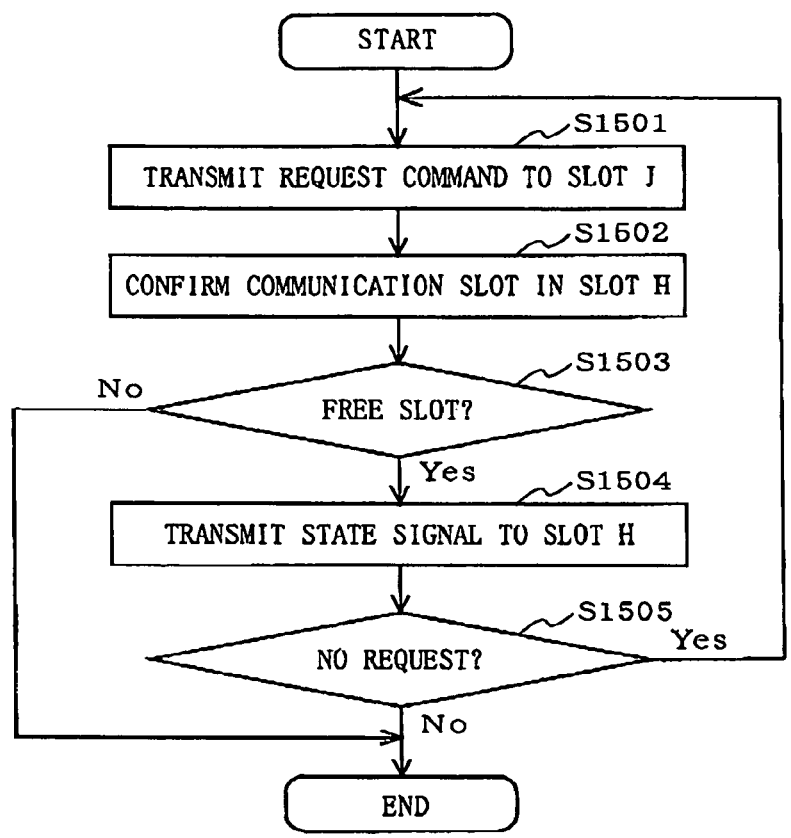
FIGS. 15 and 16 are flowcharts illustrating operations of the coexistence controllers 304 and 404.

FIG. 15 is a flowchart illustrating operations of the coexistence controllers 304 and 404 when requesting a communication slot.

The coexistence controller 304 or 404 of a communication system which requests a communication slot transmits a request command, i.e., a coexistence signal in which bit "1" is set in the slot J1 (step S1501). To prevent malfunction, a transmission side may transmit a coexistence signal consecutively a specified number of times or more, and a receiver side may interpret that there are a specified number or more of times of signal transmission in which a coexistence signal has been received. In a system having a high priority, bit "1" is set in the slot J2 as well.

Next, the coexistence controller 304 or 404 of a communication system which requests a communication slot confirms a free slot having bit "0" among the slots H1 to H4 (steps S1502 and S1503), and uses the communication slots S1 to S4 corresponding to the free slot to start data communication (step S1504). If there is no free slot, the coexistence controller 304 or 404 gives up communication. Note that it can be arbitrarily set how many slots one communication system can secure simultaneously. For example, when a maximum of two communication slots can be simultaneously secured, it is forbidden to simultaneously secure three or more communication slots. In this case, however, a total of three or more communication slots may be occupied by repeating a resource request procedure. However, signals in the next slots J1 and J2 can be only transmitted a predetermined time interval after securing a resource (step S1505).

Figure 16:
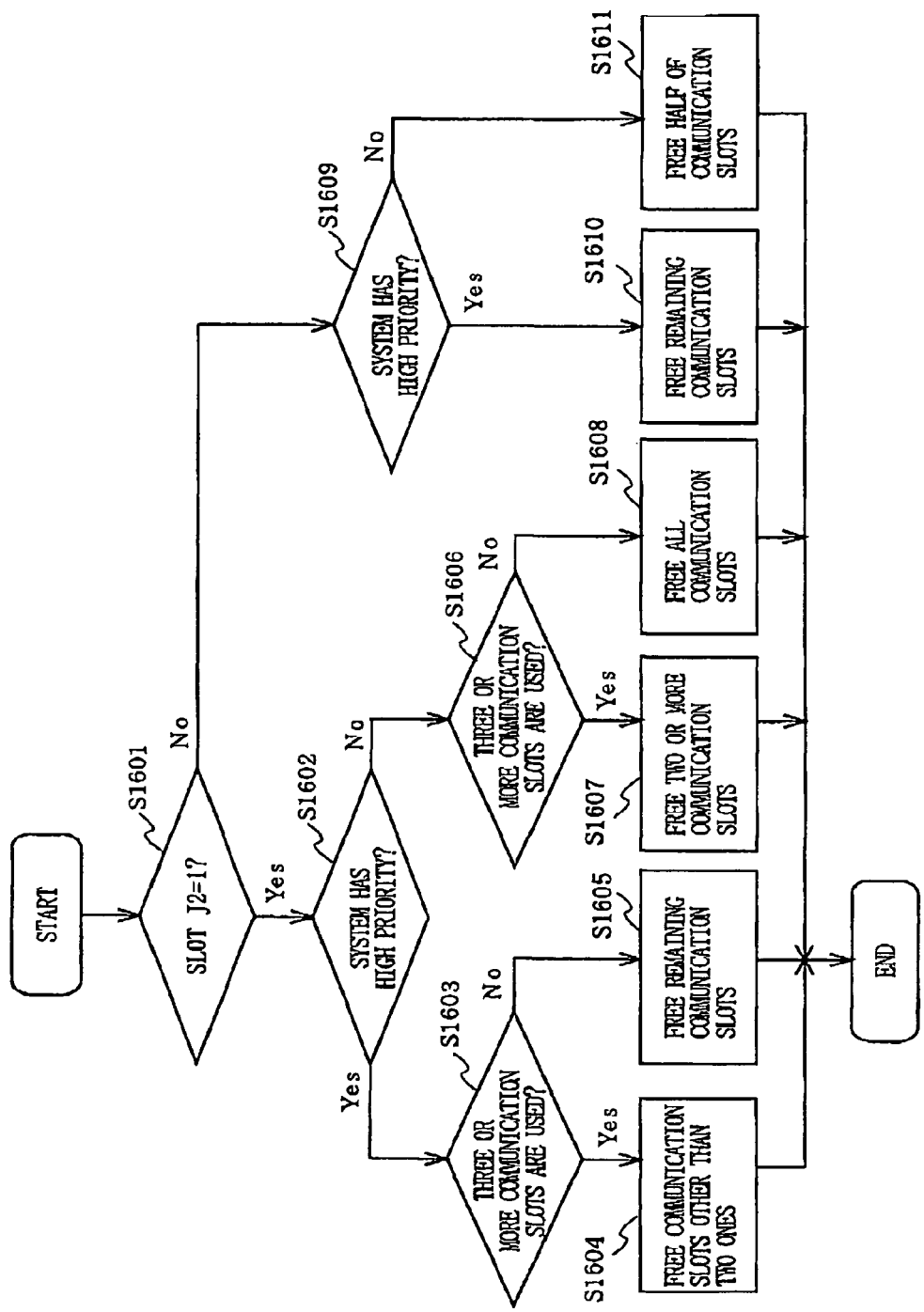
Figure 17:
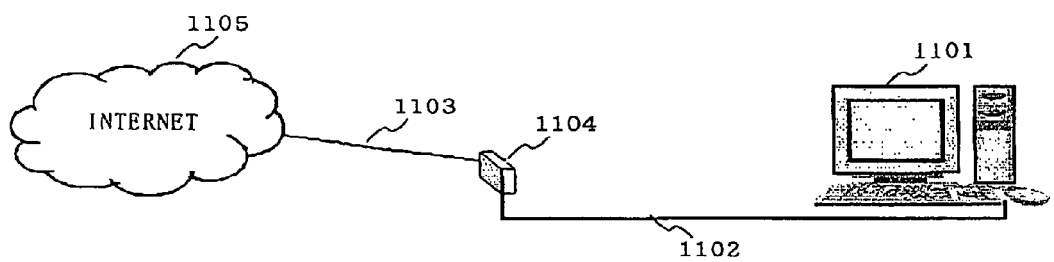
FIGS. 17 to 19 are diagrams illustrating an exemplary configuration of a conventional system when the Internet is accessed from a PC in a home.
Figure 18:
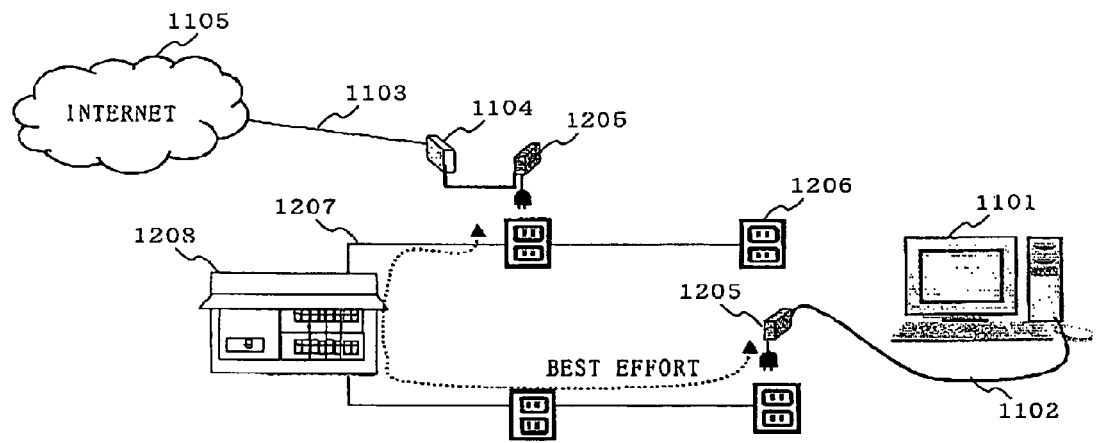
Figure 19:
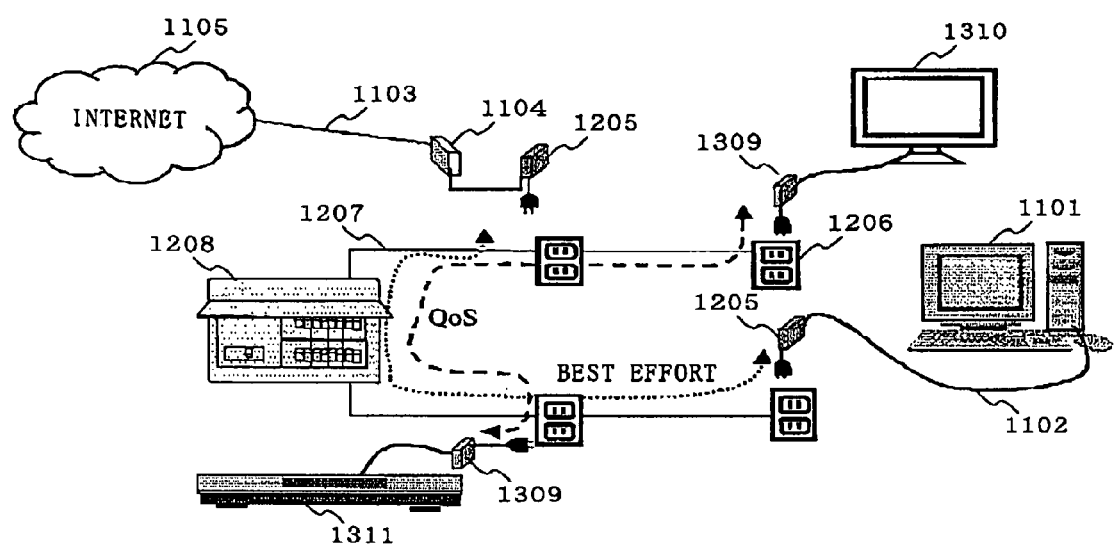
Figure 20:
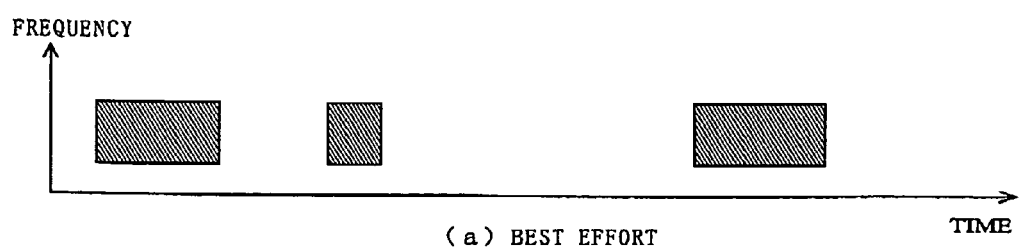
FIG. 20 is a diagram illustrating an exemplary data stream transmitted on a communication medium.
Figure 20:
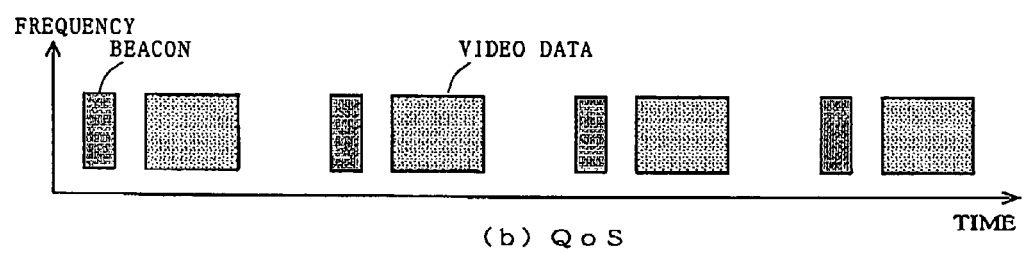
Figure 20:
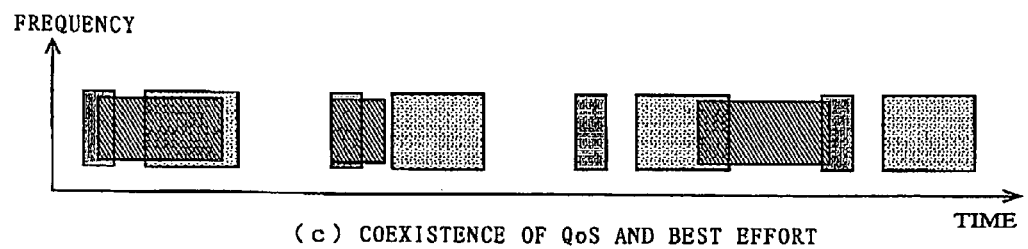
Figure 21:
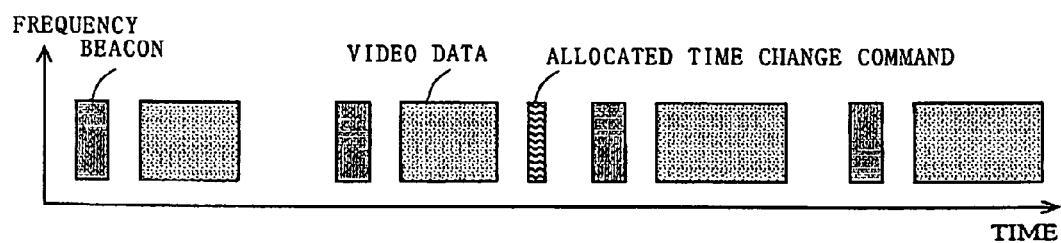
FIG. 21 is a diagram illustrating an exemplary QoS data stream transmitted on a communication medium.
Figure 22:
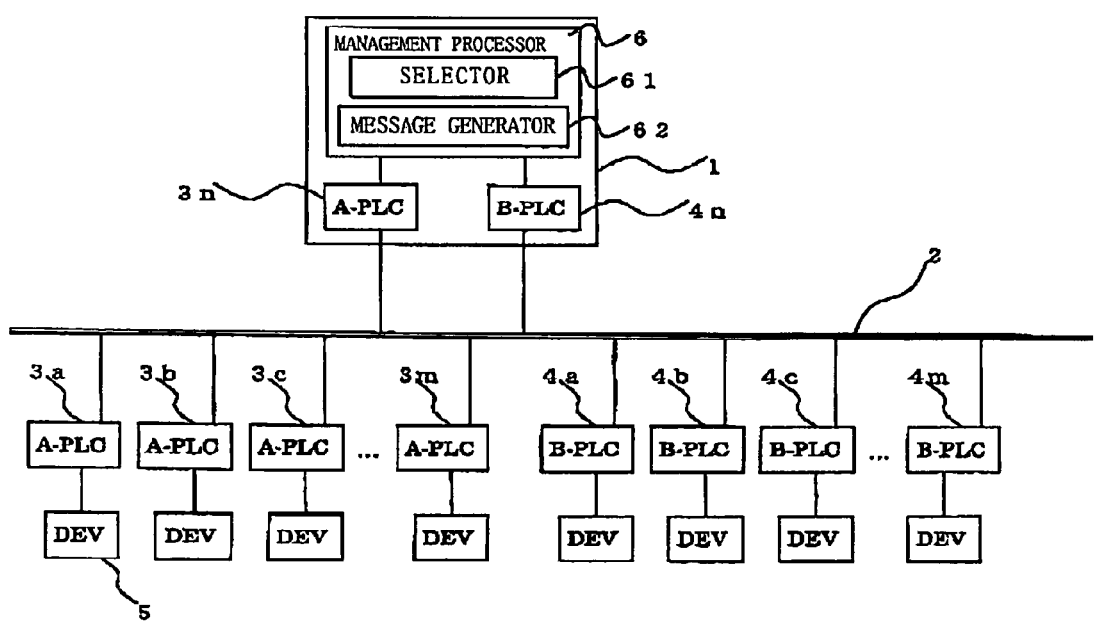
FIG. 22 is a diagram illustrating an exemplary configuration of a conventional communication system which enables coexistence of a plurality of power line modems.

FIG. 16 is a flowchart illustrating an operation when the coexistence controllers 304 and 404 which are using a communication slot detects signals in the slots J1 and J2.

A communication system invariably confirms a signal which is transmitted and received by the coexistence controller 304 or 404 and is passed on a power line in constant cycles (i.e., a command and a state signal), using a zero-crossing point of AC mains as a reference. Thereafter, when a signal (bit=1) in the slot J1 is received, the operation of FIG. 16 is started. Note that, assuming that it is previously determined that a communication system which requests a communication slot transmits signals in the slots J1 and J2 a predetermined number of times, if the operation of FIG. 16 is started when the signals have been received a plurality of times, a control having less malfunction can be achieved.

In FIG. 16, the communication system which has received the signal in the slot J1, determines whether or not there is also a signal (bit=1) in the slot J2 (step S1601). When determining that there is also a signal in the slot J2, the communication system determines that a communication system having a high priority requests participation. Thereafter, the communication system determines its own priority (step S1602) and confirms a currently used communication slot (steps S1603 and S1606).

When a communication system has a high priority and uses three or more communication slots, only two communication slots can be continued to use, and the other communication slots are freed. (step S1604). On the other hand, when a communication system has a high priority and uses two or less communication slots, the currently used communication slots are continued to use, or a communication slot, if any, is freed (step S1605).

When a communication system has a low priority and uses three or more communication slots, two or more communication slots are freed (step S1607). On the other hand, when a communication system has a low priority and two or less communication slots, all the currently used communication slots are freed (step S1608).

When a communication system determines that there is not a signal in the slot J2, the communication system determines that a communication system which has a bit set in the slot J1 has a low priority. Thereafter, the communication system determines its own priority (step S1609). When a communication system determines that its own priority is high, the communication system continues to use a currently used communication slot, or frees a communication slot to be freed, if any (step S1610). On the other hand, when a communication system determines that its own priority is low, the communication system frees half of currently used communication slots (step S1611).

As described above, according to the power line communication system of the second embodiment of the present invention, a communication system having a high priority uses a minimum number of communication slots required to secure QoS of the system, and if there is a remaining communication slot, allocates the remaining slot to a communication system having a low priority. Note that, if two communication systems have the same priority, halves of communication slots may be used for the respective communication slots. For example, it is considered that, if a transmission distance with respect to a power line of a neighboring home in an apartment house or the like, so that power line communication modems interfere with each other, a user in each home sets the same high priority. Therefore, the present invention is useful in such a case.

Note that the whole or a part of the functional blocks constituting the coexistence controller described in the first and second embodiments may be typically implemented as an integrated circuit (LSI: LSI is be called IC, system LSI, super LSI, ultra LSI or the like, depending on the packaging density). Each functional block may be separately mounted on one chip, or the whole or a part of the functional blocks may be mounted on one chip.

The integrated circuit is not limited to LSI. The integrated circuit may be achieved by a dedicated circuit or a general-purpose processor. Further, an FPGA (Field Programmable Gate Array) which can be programmed after LSI production or a reconfigurable processor in which connection or settings of circuit cells in LSI can be reconfigured, may be used.

Furthermore, if an integrated circuit technology which replaces LSI is developed by an advance in the semiconductor technology or the advent of other technologies derived therefrom, the functional blocks may be packaged using such technologies. A biotechnology may be applicable.

Note that the functions of the power line communication systems of the first and second embodiments can be each implemented by causing a CPU to interpret and execute predetermined program data capable of executing the above-described procedure, the program being stored in a storage apparatus (a ROM, a RAM, a hard disk, etc.). In this case, the program data may be stored into the storage apparatus via a recording medium, or may be executed directly from the recording medium. The recording medium refers to a semiconductor memory, such as a ROM, a RAM, a flash memory or the like; a magnetic disk memory, such as a flexible disk, a hard disk or the like; an optical disc, such as a CD-ROM, a DVD, a BD or the like; a memory card; or the like. The recording medium is a concept including a communication medium, such as a telephone line, a transfer line or the like.

The in-home communication apparatus including the present invention may be in the form of an adaptor which converts a signal interface, such as Ethernet interface, IEEE1394 interface, USB interface or the like, into interface for power line communication, and thereby, can be connected to multimedia apparatuses, such as a-personal computer, a DVD recorder, a digital television, a home system server and the like, which have signal interface. Thereby, a network system which transmits digital data, such as multimedia data or the like, via a power line as a medium with high speed, can be constructed. As a result, a power line which is already provided in homes, offices and the like can be directly used as a network line without newly introducing a network cable, such as a conventional wired LAN. Therefore, the present invention is considerably useful in terms of cost and ease of installation.

The functions of the present invention may be incorporated into multimedia apparatuses in the future. Thereby, data transfer can be achieved between apparatuses via a power supply cable of the multimedia apparatus. In this case, an adaptor, an Ethernet cable, an IEEE1394 cable, a USB cable and the like are not required, thereby simplifying wiring. Also, the high-speed power line transmission system of the present invention can be connected via a rooter to the Internet, or via a hub or the like to a wireless LAN or a conventional wired cable LAN, thereby extending a LAN system in which the high-speed power line transmission system of the present invention is used without any problem.

Communication data transferred via a power line by power line transmission may be intercepted by an apparatus directly connected to the power line, but is free from an eavesdrop problem with wireless LAN. Therefore, the power line transmission scheme is effective for data protection in terms of security. Further, data transferred on a power line may be protected by IPSec of an IP protocol, encryption of the contents themselves, other DRM schemes or the like.

As compared to conventional power line communication, high-quality AV content transmission on a power line can be achieved by using a copyright protection function employing the above-described encryption of contents or efficient communication media (an effect of the present invention), and further implementing a QoS function.

While the invention has been described in detail, the foregoing description is in all aspects illustrative and not restrictive. It is understood that numerous other modifications and variations can be devised without departing from the scope of the invention.

What is claimed is:

1. A communication apparatus comprising:
   a controller for managing communication slots necessary for a first communication system to which the communication apparatus belongs;
   a command generator for generating a request command which requests use of a communication slot necessary for the first communication system, so as to indicate the request command to a second communication system which coexists with the first communication system via a communication medium by time division communication using the communication slots,
   a transmitter for transmitting the request command generated by the command generator; and
   a communication manager for controlling transmission of the request command in cooperation with the controller, wherein
   the request command includes information about a priority of the request command, and
   the communication manager causes, when the communication slots necessary for the first communication system cannot be secured, the transmitter to transmit the request command of a higher priority, and causes the second communication system to free half of communication slots used by the second communication system, to secure the communication slots having been freed.

2. A communication apparatus comprising:
   a controller for managing communication slots necessary for a first communication system to which the communication apparatus belongs;
   a command generator for generating a request command which requests use of a communication slot necessary for the first communication system, so as to indicate the request command to a second communication system which coexists with the first communication system via a communication medium by time division communication using the communication slots,
   a transmitter for transmitting the request command generated by the command generator; and
   a communication manager for controlling transmission of the request command in cooperation with the controller, wherein
   the request command includes information about a priority of the request command, and
   the communication manager causes, when the communication slots necessary for the first communication system cannot be secured, the transmitter to transmit the request command of a lower priority, and causes the second communication system to free a quarter of communication slots used by the second communication system, to secure the communication slots having been freed.

* * * * *